United States Patent [19]

Fujita et al.

[11] Patent Number: 5,030,690

[45] Date of Patent: Jul. 9, 1991

[54] HALOGEN-CONTAINING THERMOPLASTIC RESIN COMPOSITION

[75] Inventors: Minoru Fujita; Hiroshi Takida, both of Takatsuki; Yoshiharu Nagao, Kurashiki, all of Japan

[73] Assignee: Nippon Gohsei Kagaku Kogyo Kabushiki Kaisha, Osaka, Japan

[21] Appl. No.: 349,464

[22] Filed: May 9, 1989

[30] Foreign Application Priority Data

May 13, 1988 [JP] Japan ................. 63-117919

[51] Int. Cl.$^5$ ..................... C08L 27/06; C08L 51/06
[52] U.S. Cl. ........................ 525/80; 525/309
[58] Field of Search ............ 525/80, 302, 309

[56] References Cited

U.S. PATENT DOCUMENTS 3,968,184  7/1976  Hardt ................... 525/80

FOREIGN PATENT DOCUMENTS 54-30699  10/1979  Japan .
61-16949   1/1986  Japan .
62-127334  6/1987  Japan .

OTHER PUBLICATIONS

Derwent and CA Abstracts of J61016949.

Primary Examiner—John C. Bleutge
Assistant Examiner—David Buttner
Attorney, Agent, or Firm—Armstrong, Nikaido, Marmelstein, Kobovcik & Murray

[57] ABSTRACT

This invention relates to a halogen-containing thermoplastic resin composition comprising 100 parts by weight of a halogen-containing termoplastic resin (A) and 1 to 100 parts by weight of a graft polymer (B) having a melt index of 1 to 15 g/10 min as determined at a temperature of 190° C. under a load of 2.16 kg and a benzene-insoluble fraction content of not more than 30 percent by weight as obtainable by graft-polymerizing 100 parts by weight of an ethylene-vinyl acetate copolymer having a vinyl acetate content of 50 to 90 percent by weight as a substrate with 5 to 50 parts by weight of at least one monomer which, when polymerized alone, gives a homopolymer with a glass transition temperature of 65° to 150° C. (b2). This resin composition has markedly improved long-run moldability.

2 Claims, No Drawings

HALOGEN-CONTAINING THERMOPLASTIC RESIN COMPOSITION

BACKGROUND OF THE INVENTION

This invention relates to a halogen-containing thermoplastic resin composition having markedly improved long-run moldability.

Halogen-containing thermoplastic resins, represented by polyvinyl chloride resin, are not only comparatively inexpensive but generally satisfactory in clarity, mechanical properties and processability so that they find application in a broad spectrum of products such as film, sheet, hose, flexible container, coated cloth, leather cloth, cover sheet, tarpaulin, shoe sole, sponge, wire covering, household goods and so on.

However, halogen-containing thermoplastic resins have the disadvantage of a narrow molding temperature range because of proximity between the processable temperature and thermal degradation temperature, not to speak of their poor service durability and low impact resistance.

In order to improve their moldability and other properties, it has been practiced to blend halogen-containing thermoplastic resins with various modifying resins such as polyethylene chloride, ethylene-vinyl acetate copolymer, acrylonitrile-butadiene-styrene terpolymer, (meth)acrylate copolymer, etc. Of these modifying resins, ethylene-vinyl acetate copolymer has been considered to be particularly useful.

The use of a grafted ethylene-vinyl acetate copolymer as a modifying resin has also been proposed and attracting attention.

For example, Japanese Patent Publication No. 30699/1979 discloses a resin composition prepared by graft-emulsion-polymerizing an olefin with an aqueous dispersion of an ethylene-vinyl acetate copolymer (ethylene content 85-60 weight %) to prepare a graft copolymer and compounding this graft copolymer and a liquid plasticizer with vinyl chloride resin.

Japanese Patent Application KOKAI No. 16949/1986 discloses a resin composition prepared by suspension-polymerizing a vinyl monomer, for example vinyl acetate, ethylene, methyl acrylate, ethyl acrylate, methyl methacrylate, acrylonitrile, etc., which has a solubility parameter of 8.5 to 15, in the presence of an emulsion-polymerized ethylene-vinyl acetate copolymer with a vinyl acetate content of 90 to 50 weight % to give a modified ethylene-vinyl acetate copolymer and, then, blending this modified copolymer with vinyl chloride resin.

Japanese Patent Application KOKAI No. 127334/1987 discloses a resin composition prepared by blending vinyl chloride resin with a butadiene-vinyl monomer (selected from the group consisting of styrenes, acrylonitriles and (meth)acrylates) copolymer and a graft copolymer prepared by treating a vinyl esterethylene copolymer with a vinyl monomer (selected from the group consisting of styrenes, acrylonitriles and (meth)acrylates) under graft-copolymerization conditions.

Furthermore, Japanese Patent Publication Nos. 22909/1969, 23027/1970 and 11704/1980 disclose methods of blending a grafted ethylene-vinyl acetate copolymer with polyvinyl chloride resin.

However, such methods for blending an ethylene-vinyl acetate copolymer with polyvinyl chloride resin have the following disadvantages.

(a) When the ethylene-vinyl acetate copolymer is a pulverizate of a solution polymerization product, its homogeneous miscibility with polyvinyl chloride is poor.

(b) When the ethylene-vinyl acetate copolymer is a suspension polymerization product, the blocking problem tends to occur if premixing is carried out en masse prior to melt-molding (extrusion molding or calendering). In other words, hot blending is difficult. Furthermore, in calendering, the plate-out problem (adhesion of the blend to the metal roll) tends to occur. In the case of extrusion molding, the melt viscosity of copolymer falls remarkably and so that the heterogeneous dispersion tends to occur.

(c) When the ethylene-vinyl acetate copolymer is an emulsion polymerization product, the heat resistance of the product is sacrificed in addition to the above-mentioned disadvantages (b).

When the resin compositions proposed in the above patent literature are actually used in the field or the graft copolymers described there are purchased from commercial sources and blended with polyvinyl chloride resin, the results are better than those achieved by blend of the ethylene-vinyl acetate copolymer but the long-run moldability is not fully satisfactory and the heat resistance and homogeneous miscibility are often inadequate.

The inventor of the present invention has found that the above-mentioned disadvantages can be overcome by blending the grafted ethylene-vinyl acetate copolymer described hereinafter with polyvinyl chloride resin. The present invention has been predicated on the above finding.

SUMMARY OF THE INVENTION

This invention is directed to a halogen-containing thermoplastic resin composition comprising 100 parts by weight of a halogen-containing thermoplastic resin (A) and 1 to 100 parts by weight of a graft polymer (B) having a melt index of 1 to 15 g/10 min as determined at a temperature of 190° C. under a load of 2.16 kg and a benzene-insoluble fraction content of not more than 30 percent by weight as obtainable by graft-polymerizing 100 parts by weight of an ethylene-vinyl acetate copolymer having a vinyl acetate content of 50 to 90 percent by weight as a substrate (b1) with 5 to 50 parts by weight of at least one monomer which, when polymerized alone, gives a homopolymer with a glass transition temperature of 65° to 150° C. as a grafting component (b2).

DETAILED DESCRIPTION OF THE INVENTION

Halogen-Containing Thermoplastic Resin (A)

As examples of said halogen-containing thermoplastic resin (A), there may be mentioned polyvinyl chloride resin, polyvinylidene chloride resin, chlorinated polyvinyl chloride, chlorinated ethylene-vinyl acetate copolymer, chlorosulfonated polyethylene and so on. Particularly preferred is polyvinyl chloride resin, which is a homopolymer of vinyl chloride or a copolymer of vinyl chloride with one or more other comonomers.

Graft Polymer (B)

As the graft polymer (B) to be blended with said halogen-containing thermoplastic resin (A), a graft polymer of ethylene-vinyl acetate copolymer (b1), which is a graft substrate, with at least one monomer (b2) is employed.

As the ethylene-vinyl acetate copolymer (b1), which is the graft substrate, a copolymer having a vinyl acetate content of 50 to 90 percent by weight is employed. Any copolymer, of the type, that is outside of the above composition range does not produce a satisfactory modifying effect.

Such an ethylene-vinyl acetate copolymer (b1) can be prepared by any of solution polymerization, emulsion polymerization and suspension polymerization techniques but since the suspension-polymerized copolymer is conducive to more satisfactory results than the solution-polymerized or emulsion-polymerized copolymer, the use of suspension polymerization technique is recommended.

As the grafting component monomer (b2) which is to be grafted to the above-mentioned ethylene-vinyl acetate copolymer (b1) substrate, at least one monomer (b2) which, when polymerized alone, gives a homopolymer with a glass transition temperature of 65° to 150° C. is employed. When any monomer giving a homopolymer with a glass transition temperature lower than 65° C. is used, the resulting graft copolymer does not provide for satisfactory hot blendability or processability with the halogen-containing thermoplastic resin (A), while a monomer giving a homopolymer with a glass transition temperature in excess of 150° C. only provides a graft polymer which, when blended with the halogen-containing thermoplastic resin (A), causes fish-eyes (incompletely dissolved matter), scorelines or streaks, and poor surface flatness and smoothness. It should be understood, however, that the use of a monomer giving a homopolymer with a glass transition temperature outside the range of 65° to 150° C. in combination with said monomer (b2) is permissible only if its relative amount is not too large for attainment of the expected effects of the invention.

Such a monomer (b2) is expressed by the following general formula $CH_2=CR.X$ wherein R means H or $CH_3$; X means COOR' (R'=alkyl group), CN,

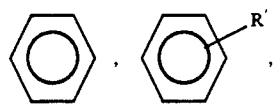

or the like. As examples of b2 can be mentioned methacrylic esters such as methyl methacrylate, ethyl methacrylate, isopropyl methacrylate, phenyl methacrylate, etc., unsaturated nitriles such as acrylonitrile, methacrylonitrile, etc.; and styrene compounds such as styrene, 4-methylstyrene and so on.

The proportion of said monomer (b2) relative to said ethylene-vinyl acetate copolymer (b1) is selected from the range of 5 to 50 parts by weight based on 100 parts by weight of the latter. If the proportion of the monomer (b2) is less than 5 parts by weight, the hot blendability of the resulting graft copolymer with halogen-containing thermoplastic resin (A) is poor. If, conversely, the proportion of (b2) exceeds 50 parts by weight, the physical properties of the product are sacrificed.

The graft copolymer (B) must have a melt index in the range of 1 to 15 g/10 min. as determined at a temperature of 190° C. under a load of 2.16 kg. When the melt index of (B) is outside the above range, even if all the other requirements are fully satisfied, the melt viscosity differential from that of halogen-containing thermoplastic resin (A) is increased to adversely affect the compatibility and dispersibility with the resin (A).

Furthermore, the graft polymer (B) must be such that its benzene-insoluble fraction content is not more than 30 percent by weight and preferably not more than 25 percent by weight. When the benzene-insoluble fraction exceeds 30 percent by weight, even if all the other requirements are fulfilled, the product obtained by blending it with halogen-containing thermoplastic resin (A) has the drawbacks of fish-eyes, streaks and loss of surface flatness, thus detracting from its appearance.

The term "benzene-insoluble fraction content" means the value found as follows. Thus, about 1 g of a sample of graft polymer (B), previously dried, is accurately weighed and added to 100 ml of benzene which has also been accurately taken and the mixture is stirred at 81°±1° C. for 5 hours. After cooling, the solution is filtered through a 5 mm-thick layer of sanitary cotton J. P. (Japanese Pharmacopoeia) in a funnel to separate insolubles and 10 ml of the filtrate is accurately taken and heated on an electrically heated constant-temperature water bath to remove the benzene and further dried in an electric constant-temperature dryer (105°±2° C.) for 1 hour. After cooling, the product is accurately weighed and the concentration of the filtrate is determined. Then, the benzene insoluble fraction content is calculated by means of the following equation.

Benzene-insoluble fraction content (%)=
$100 \times (S-C)/S$
S: amount of sample (g)
C: concentration of filtrate (g/100 ml)

As the graft polymer (B) to be used in the practice of this invention, it is more advantageous to use a premix of the graft polymer with small amounts of powdery polyvinyl chloride resin and a lubricating agent (for example, calcium stearate) than using the graft polymer alone, for the use of such a premix leads to improved hot blendability. The preferred premix contains 1 to 20 parts by weight of powdery polyvinyl chloride resin and 0.1 to 5 parts by weight of the lubricant based on 100 parts by weight of graft copolymer (B).

Blending Ratio

The blending amount of said graft polymer (B) relative to said halogen-containing thermoplastic resin (A) is selected from the range of 1 to 100 parts by weight based on 100 parts of resin (A).

If the proportion of graft polymer (B) is less than one part by weight, the desired ameliorating effect cannot be achieved, while the use of graft polymer (B) in excess of 100 parts by weight detracts from the inherent characteristics of halogen-containing thermoplastic resin (A).

Other Additives

While the halogen-containing thermoplastic resin composition of the present invention comprises said halogen-containing thermoplastic resin (A) and graft polymer (B), it may further contain various other additives such as a plasticizer, dye or pigment, filler, lubricant, antistatic agent, antitack agent, surfactant, chelating agent, reinforcing material, stabilizer, auxiliary stabilizer, antioxidant, ultraviolet absorber, flame retardant, foaming agent and so on.

Furthermore, within the range not detrimental to the object of the present invention, other modifying resins heretofore in use or proposed may also be incorporated.

Molding Procedure

As molding methods, extrusion molding, calendering, injection molding, blow molding and other known techniques can be employed.

When the above-specified graft polymer (B) is blended with halogen-containing thermoplastic resin (A), smooth premixing can be accomplished even if the two components are added en masse and there occurs no blocking, nor inclusion of over-sized grains. Moreover, the resulting compound is so free-flowing that it can be easily fed from the hopper in extrusion or injection molding.

When this premix is subjected to melt molding in a continuous run over hours, there is a minimum of variation in torque and no drawdown phenomenon takes place. Thus, excellent molding processability can be assured. Furthermore, even if molding is continued for hours, the product consistently shows a satisfactory appearance free of discoloration, gels, streaks or other defects. In addition, satisfactory results are assured in terms of softening temperature, elongation, impact strength and other physical characteristics. Particularly satisfactory results are obtained when the modifying resin is a graft polymer (B) obtained by using a suspension-polymerized ethylene-vinyl acetate copolymer (b1) as the graft substrate and graft-polymerizing it with the grafting component monomer (b2).

Therefore, the present invention represents a major contribution to the molding industry handling halogen-containing thermoplastic resins such as poly-vinyl chloride resin.

EXAMPLES

The following examples are further illustrative of the present invention. It should be noted that all parts and % are by weight unless otherwise indicated.

(Production of ethylene-vinyl acetate copolymer)

Production of EVA-1 (suspension polymerization product)

A 10 l stainless steel pressure reactor fitted with a stirrer, heating/cooling means, and liquid and gas feeding lines was charged with an aqueous solution of the following composition.

| Deionized water | 3200 g |
| Sodium polyacrylate | 4 g |
| Partially hydrolyzed polyvinyl alcohol | 4 g |

Then, 1600 g of vinyl acetate, 14 g of azobisisobutyronitrile and 3.2 g of carbon tetrachloride were added. The mixture was stirred at room temperature for thorough dispersion.

After the internal atmosphere of the reactor was replaced with nitrogen gas and, then, with ethylene, the ethylene pressure was gradually increased while the internal temperature of the reactor was increased. Then, at an internal pressure of 95 kg/cm$^2$G and a temperature of 70° C., the suspension polymerization was conducted for 10 hours.

After completion of the polymerization reaction, the reaction system was cooled and the unreacted ethylene was withdrawn to give a suspension. The conversion of vinyl acetate was 81% and the vinyl acetate content of the product ethylene-vinyl acetate copolymer was 56%. The melt index (as to ethylene-vinyl acetate copolymer materials, the melt index was determined at 190° C. and 1.2 kg; the same applies hereinafter) was 70 g/10 min and the grain size was not more than 20 mesh.

The product polymer was separated from the suspension, washed with deionized water, and submitted to the production of a graft polymer, without drying, as described hereinafter.

Production of EVA-2 (suspension polymerization product)

The same procedure as Production of EVA-1 was carried out except that an ethylene pressure of 80 kg/cm$^2$ G was used. The procedure gave an ethylene-vinyl acetate copolymer with a vinyl acetate content of 65%, a melt index of 45 g/10 min and a grain size of not more than 20 mesh.

Production of EVA-3 (solution polymerization product)

The same reactor as that described under Production of EVA-1 was charged with the following materials.

| Vinyl acetate | 3200 g |
| Butyl acetate | 800 g |
| Azobisisobutyronitrile | 14 g |

As in Production of EVA-1, the internal atmosphere of the reactor was replaced with nitrogen gas and, then, with ethylene gas and the ethylene gas pressure was gradually increased while the internal temperature of the reactor was increased. The solution polymerization was carried out at an internal pressure of 80 kg/cm$^2$ G and a temperature of 65° C. for 6 hours.

After completion of the polymerization reaction, the reaction system was cooled and the unreacted ethylene was withdrawn to give a paste. The conversion of vinyl acetate was 63% and the product ethylene-vinyl acetate copolymer had a vinyl acetate content of 63% and a melt index of 70 g/10 min.

The solvent was distilled off from the above paste and the polymer obtained was subjected to vacuum drying for removal of volatile matter. The polymer was then freeze-pulverized to recover a 20-mesh fraction.

Production of EVA-4 (emulsion polymerization product)

The same reactor as that used in Production of EVA-1 was charged with the following materials.

| Deionized water | 4200 g |
| Polyoxyethylene alkyl ether | 25 g |
| Vinyl acetate | 280 g |

As in Production of EVA-1, the reactor was purged with nitrogen gas and, then, with ethylene gas and the system was maintained at a temperature of 30° C. and an ethylene gas pressure of 60 kg/cm$^2$ G.

The reactor was then continuously charged with 220 g of an aqueous solution prepared by dissolving 4.0 g of ammonium persulfate in deionized water and bubbling nitrogen gas into the solution and 220 g of an aqueous solution prepared by dissolving 1.3 g of Rongalite in deionized water and bubbling nitrogen gas and the reaction was conducted for 2 hours.

Then, 700 g of deaerated vinyl acetate, 220 g of a deaerated aqueous solution of 4.0 g of ammonium persulfate in deionized water and a deaerated aqueous solution of 1.3 g of Rongalite in deionized water were added continuously over the whole reaction period to complete the reaction in 13 hours.

After completion of the polymerization reaction, the unreacted ethylene was withdrawn to give an emulsion. The conversion of vinyl acetate was 95% and the product ethylene-vinyl acetate copolymer had a vinyl acetate content of 55% and a melt index of 30 g/10 min.

Nitrogen gas was bubbled into this emulsion to drive out the residual vinyl acetate before use of the emulsion in the production of a graft polymer as described hereinafter.

The characteristic values of the four ethylene-vinyl acetate copolymers thus obtained are shown in Table 1.

TABLE 1

|  | Method of polymerization | Vinyl acetate content (wt %) | Melt index (g/10 min) |
|---|---|---|---|
| EVA-1 | Suspension polymerization | 56 | 70 |
| EVA-2 | Suspension polymerization | 65 | 45 |
| EVA-3 | Solution polymerization | 61.5 | 70 |
| EVA-4 | Emulsion polymerization | 55 | 30 |

Production of graft polymers

The following graft polymers were produced using the ethylene-vinyl acetate copolymers prepared above (EVA-1, EVA-2, EVA-3 and EVA-4).

Production of Graft Polymer (B-1)

A one-liter glass reactor fitted with a stirrer, cooler, drip means and thermometer was charged with an aqueous solution containing 400 g of deionized water, 0.3 g of sodium polyacrylate and 0.3 g of partially hydrolyzed polyvinyl alcohol, followed by addition of 200 g (as nonvolatile matter) of EVA-1.

The charge was stirred at room temperature for redispersion and 60 g of methyl methacrylate containing 0.06 g of benzoyl peroxide was added. The internal atmosphere of the reactor was replaced with nitrogen gas and the reaction mixture was stirred for penetration and dispersion.

The reaction was conducted at 75° C. for 4 hours and, then, cooled to give a suspension. The conversion of methyl methacrylate was 97% and the product graft polymer had a benzene-insoluble fraction content of 1.2% and a melt index (as to graft-polymers, the melt index was determined at 190° C. and 2.16 kg; the same applies hereinafter) of 3.4 g/10 min.

This graft polymer was washed with deionized water and separated. Then, based on 100 parts of its nonvolatile matter, 1 part of finely divided calcium stearate and 5 parts of powdery polyvinyl chloride were added and mixed well, followed by drying. This procedure gave a dry free-flowing graft polymer with a grain size not over 20 mesh.

Production of Graft Polymer (B-2)

The same procedure as Production of graft polymer (B-1) was carried out except that EVA-4 and 60 g of isopropyl methacrylate were used in lieu of EVA-1 and methyl methacrylate, respectively.

The resultant graft polymer had a benzene-insoluble fraction content of 6.3% and a melt index of 2.8 g/10 min.

Production of Graft Polymer (B-3)

The same procedure as Production of graft polymer (B-1) was carried out except that EVA-3, 24 g of acrylonitrile plus 16 g of methyl methacrylate and 0.08 g of benzoyl peroxide were used in lieu of EVA-1, 60 g of methyl methacrylate and 0.06 g of benzoyl peroxide, respectively.

The resulting graft polymer had a benzene-insoluble fraction content of 23% and a melt index of 5.2 g/10 min.

Production of Graft Polymer (B-4)

The same procedure as Production of graft polymer (B-1) was carried out except that EVA-2, 18 g of styrene plus 12 g of methyl methacrylate and 0.09 g of benzoyl peroxide were used in lieu of EVA-1, 60 g of methyl methacrylate and 0.06 g of benzoyl peroxide, respectively.

The resulting graft polymer had a benzene-insoluble fraction content of 3.1% and a melt index of 2.6 g/10 min.

Production of Graft Polymer (B-5)

The same procedure as Production of graft polymer (B-1) was carried out except that EVA-2 and 30 g of methyl methacrylate were used in lieu of EVA-1 and 60 g of methyl methacrylate, respectively.

The resulting graft polymer had a benzene-insoluble fraction content of 1.9% and a melt index of 14 g/10 min.

Production of Graft Polymer (B-6)

The same procedure as Production of graft polymer (B-1) was carried out except that EVA-3, 40 g of methyl methacrylate and 0.04 g of benzoyl peroxide were used in lieu of EVA-1, 60 g of methyl methacrylate and 0.06 g of benzoyl peroxide.

The resulting graft polymer had a benzene-insoluble fraction content of 1.0% and a melt index of 18 g/10 min.

Production of Graft Polymer (B-7)

The same procedure as Production of graft polymer (B-1) was carried out except that 0.30 g of benzoyl peroxide was used in lieu of 0.06 g of benzoyl peroxide.

The resulting graft polymer had a benzene-insoluble fraction content of 15% and a melt index of 0.8 g/10 min.

Production of Graft Polymer (B-8)

The same procedure as Production of graft polymer (B-1) was carried out except that EVA-4 and 0.45 g of benzoyl peroxide were used in lieu of EVA-1 and 0.06 g of benzoyl peroxide, respectively.

The resulting graft polymer had a benzene-insoluble fraction content of 37% and a melt index of 1.1 g/10 min.

The characteristic values of the above 8 different graft polymers are shown in Table 2.

TABLE 2

| Graft polymer | | Benzene-insoluble fraction content (%) | Melt index (g/10 min) |
|---|---|---|---|
| Substrate | Monomer | | |
| B-1 | EVA-1 200 g | MMA 60 g | 1.2 | 3.4 |
| B-2 | EVA-4 200 g | IPMA 60 g | 6.3 | 2.8 |
| B-3 | EVA-3 200 g | AN 24 g° MMA 16 g | 23 | 5.2 |
| B-4 | EVA-2 200 g | St 18 g MMA 12 g | 3.1 | 2.6 |
| B-5 | EVA-2 200 g | MMA 30 g | 1.9 | 14 |
| B-6 | EVA-3 200 g | MMA 40 g | 1.0 | 18 |
| B-7 | EVA-1 200 g | MMA 60 g | 15 | 0.8 |
| B-8 | EVA-4 200 g | MMA 60 g | 37 | 1.1 |

Note 1
In the "Monomer" column, MMA stands for methyl methacrylate, IPMA for isopropyl methacrylate, AN for acrylonitrile, and St for styrene.
Note 2
The underlined value is outside of the defined range for the graft polymer of this invention. Thus, B-6, B-7 and B-8 are control graft polymers.
Note 3
EVA-1 and EVA-2 are suspension polymerization products; EVA-3 is a solution polymerization product; and EVA-4 is an emulsion polymerization product.

Halogen-containing thermoplastic resin compositions

Using the 8 different graft polymers obtained as above, premixing performance, long-run molded products were investigated. (The types of modifying polymers and the proportions of such modifying polymers based on polyvinyl chloride are shown in Table 3).

| Formula | |
|---|---|
| Polyvinyl chloride (degree of polymerization 800) | 100 Parts |
| Modifying polymer | Variable |
| Dibutyltin mercaptide stabilizer | 2 Parts |
| Hoechst wax OP (lubricant) | 0.2 Part |

Premixing performance

A 100-liter high speed mixer was charged with the above materials and premixing was carried out under the following conditions.

| | |
|---|---|
| Impeller type: | Standard |
| Speed: | 1,250 rpm |
| Charge: | Polyvinyl chloride, 25 kg |
| Method for addition: | All the charge was added initially en masse. |

When the resin temperature in the reactor had reached 120° C., the mixing speed was reduced to 800 rpm and the contents were withdrawn. Based on the motor load just before withdrawal and the occurrence or non-occurrence of blocking during the mixing procedure, hot blending performance was evaluated in accordance with the 3-grade rating schedule of o, Δ and x.

Furthermore, after withdrawal, the contents were cooled in a cooling mixer and the uniformity and flowability of the resulting compound were investigated. As to uniformity, the presence or absence of over-sized grains was investigated and as to flowability, the determination of the angle of repose and a sensory evaluation of free-flowing or grainy sensation were performed and each parameter was rated according to the 3-grade schedule of o, Δ and x.

Long-run Moldability

The compound after premixing was subjected to extrusion molding and the molding abnormality (drawdown and torque change) and the appearance (coloration, fish-eyes, streaks) and physical properties (softening temperature, elongation, impact strength) of the product after 8 hours of continuous molding were investigated. The softening temperature was determined by the Vicat method according to JIS K6740, the elongation according to JIS K6745, and the impact strength by the Izod method according to JIS K7110.

The molding conditions were as follows.

| Extrusion conditions | |
|---|---|
| Extruder: | 30 mm in dia. |
| T die: | 200 mm wide, sheet thickness 0.3 mm |
| Screw: | Full-flight constant pitch L/D = 20, C.R. = 3 Speed: 30 rpm |
| Temperature (°C.): | C1 C2 C3 H D<br>160 175 190 170 185 |
| Screen: | 80 mesh × 2 |
| Takeup roll: | 85-90° C. |

Results

The results are shown in Table 3.

It is apparent from Table 3 that the resin composition of this invention is excellent in all of premixing performance, long-run moldability and the appearance and physical properties of the product after hours of molding.

TABLE 3

| | Resin composition | | Premixing | | | |
|---|---|---|---|---|---|---|
| | | Modifying | Hot | Compoundability | | |
| | PVC (parts) | resin (parts) | blendability | Uniformity | Flowability | Molding abnormality |
| Example 1 | 100 | B-1 5 | o | o | o | No |
| Example 2 | 100 | B-4 10 | o | o | o | No |
| Example 3 | 100 | B-5 10 | o | o | o | No |
| Example 4 | 100 | B-2 5 | o | o | o | Slight fluctuation of torque |
| Example 5 | 100 | B-3 5 | o | o | o | Slight fluctuation of torque |
| Comparative Example 1 | 100 | Not used | o | o | o | Slight drawdown |
| Comparative Example 2 | 100 | B-6 5 | Δ | o | Δ | Decrease in torque, drawdown, large change in torque |
| Comparative | 100 | B-7 5 | o | o | o | Change in torque |

TABLE 3-continued

| | | | | | | |
|---|---|---|---|---|---|---|
| Example 3 | | | | | | |
| Comparative Example 4 | 100 | B-8 | 5 | o | o | o | No |
| Comparative Example 5 | 100 | b' | 5 | x | x | x | Decrease in torque, drawdown |
| Comparative Example 6 | 100 | B'-1 | 5 | o | o | o | No |
| Comparative Example 7 | 100 | B'-2 | 5 | o | o | o | Decrease in torque, drawdown |

| | Long-run moldability Appearance of product | | | Physical properties of product | | |
|---|---|---|---|---|---|---|
| | Coloration | FE | Streaks | Softening temperature | Elongation | Impact strength |
| Example 1 | No | No | No | 68° C. | 72% | 5 Kg · cm/cm$^2$ |
| Example 2 | No | No | No | 65° C. | 93% | 7 Kg · cm/cm$^2$ |
| Example 3 | No | No | No | 65° C. | 87% | 7 Kg · cm/cm$^2$ |
| Example 4 | No | No | No | 67° C. | 70% | 5 Kg · cm/cm$^2$ |
| Example 5 | Pale yellow | No | No | 67° C. | 85% | 6 Kg · cm/cm$^2$ |
| Comparative Example 1 | No | No | Yes | 69° C. | 37% | 3 Kg · cm/cm$^2$ |
| Comparative Example 2 | No | Yes | Yes | 67° C. | 45% | 3 Kg · cm/cm$^2$ |
| Comparative Example 3 | No | Yes | Yes | 68° C. | 63% | 4 Kg · cm/cm$^2$ |
| Comparative Example 4 | Pale yellow | Yes | Yes | 68° C. | 42% | 4 Kg · cm/cm$^2$ |
| Comparative Example 5 | No | No | No | 63° C. | 97% | 7 Kg · cm/cm$^2$ |
| Comparative Example 6 | Pale yellow | Yes | Yes | 64° C. | 55% | 4 Kg · cm/cm$^2$ |
| Comparative Example 7 | Pale yellow | Yes | No | 63° C. | 62% | 4 Kg · cm/cm$^2$ |

Notes

In the "Modifying resin" column, b' = a suspension-polymerized ethylene-vinyl acetate copolymer with a vinyl acetate content of 56%. B'-1 = a graft polymer with a benzene-insoluble fraction content of 1.8% and a melt index of 23 g/10 min. as obtained by graft-polymerizing 25 parts of methyl methacrylate with 100 parts of an emulsion-polymerized ethylene-vinyl acetate copolymer with a vinyl acetate content of 59% under suspension-polymerizing conditions, and B'-2 = a graft copolymer with a benzene-insoluble fraction content of 5.2% and a melt index of 3.5 g/10 min. as obtained by graft-polymerizing 18 parts of ethylene with 100 parts of an emulsion-polymerized ethylene-vinyl acetate copolymer with a vinyl acetate content of 75% at high pressure under suspension-polymerizing conditions.

In the "Appearance of product" column, FE stands for fish-eye and NO means that the number of FE is not more that 1 per m$^2$ while YES means that the number of FE is not less than 5 per m$^2$.

What is claimed is:

1. A halogen-containing thermoplastic resin composition comprising 100 parts by weight of a halogen-containing thermoplastic resin (A) and 1 to 100 parts by weight of a graft polymer (B) having a melt index of 1 to 15 g/10 min as determined at a temperature of 190° C. under a load of 2.16 kg and a benzene-insoluble fraction content of not more than 30 percent by weight as obtainable by graft-polymerizing 100 parts by weight of a suspension-polymerized ethylene-vinyl acetate copolymer having a vinyl acetate content of 50 to 90 percent by weight as a substrate (b1) with 5 to 50 parts by weight of at least one monomer which, when polymerized alone, gives a homopolymer with a glass transition temperature of 65° to 150° C. as a grafting component (b2).

2. The resin composition of claim 1 wherein said halogen-containing thermoplastic resin (A) is a polyvinyl chloride resin.

* * * * *